J. H. SMITH.
LAWN MOWER.
APPLICATION FILED JULY 19, 1909.

957,009.

Patented May 3, 1910.
4 SHEETS—SHEET 3.

Witnesses

Inventor
Josiah H. Smith,
By Joshua R. H. Potts.
Attorney

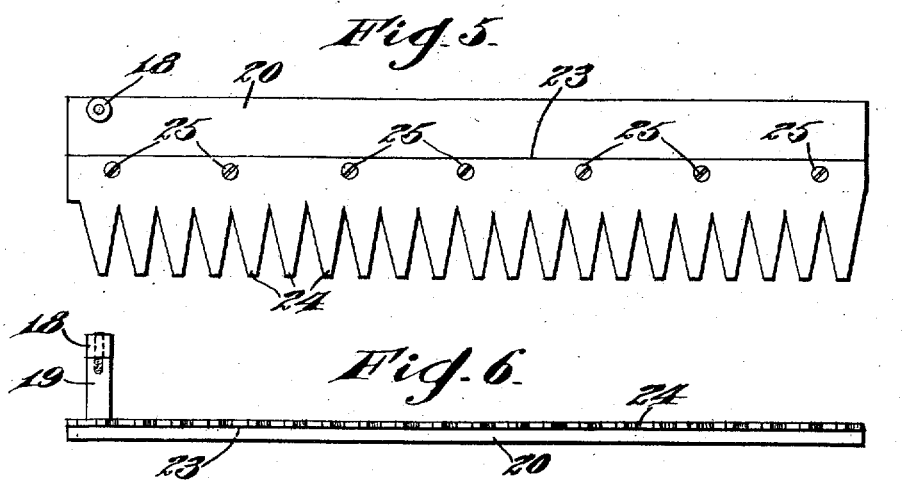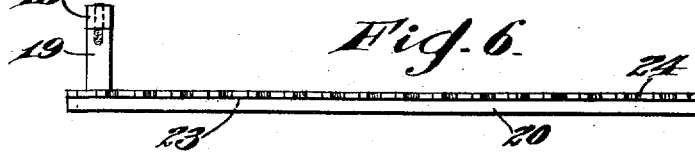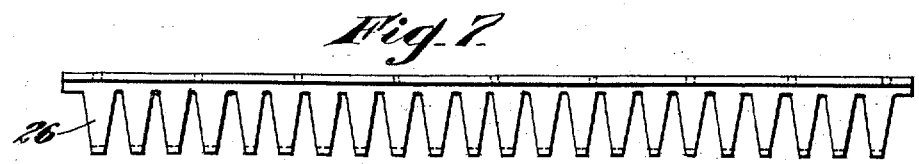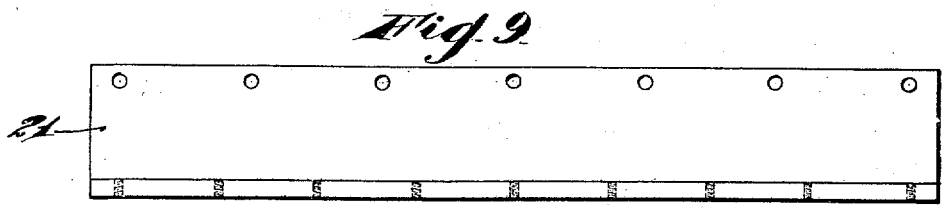

UNITED STATES PATENT OFFICE.

JOSIAH H. SMITH, OF PHILADELPHIA, PENNSYLVANIA, ASSIGNOR TO WILLIAM H. TIGERMAN, OF PHILADELPHIA, PENNSYLVANIA.

LAWN-MOWER.

957,009. Specification of Letters Patent. Patented May 3, 1910.

Application filed July 19, 1909. Serial No. 508,348.

*To all whom it may concern:*

Be it known that I, JOSIAH H. SMITH, a citizen of the United States, residing at Philadelphia, in the county of Philadelphia and State of Pennsylvania, have invented certain new and useful Improvements in Lawn-Mowers, of which the following is a specification.

My invention relates to lawn mowers, the object of the invention being to provide an improved construction and mounting of a reciprocating knife or cutter, with an improved cam operating means to reciprocate the knife as the lawn mower is moved over the ground.

A further object is to provide an improved construction of frame work for supporting the several parts of the mower, which are neat and attractive in appearance, comparatively cheap to manufacture, and strong and durable in use.

With these and other objects in view, the invention consists in certain novel features of construction, and combinations and arrangements of parts as will be more fully hereinafter described and pointed out in the claims.

Figure 1:
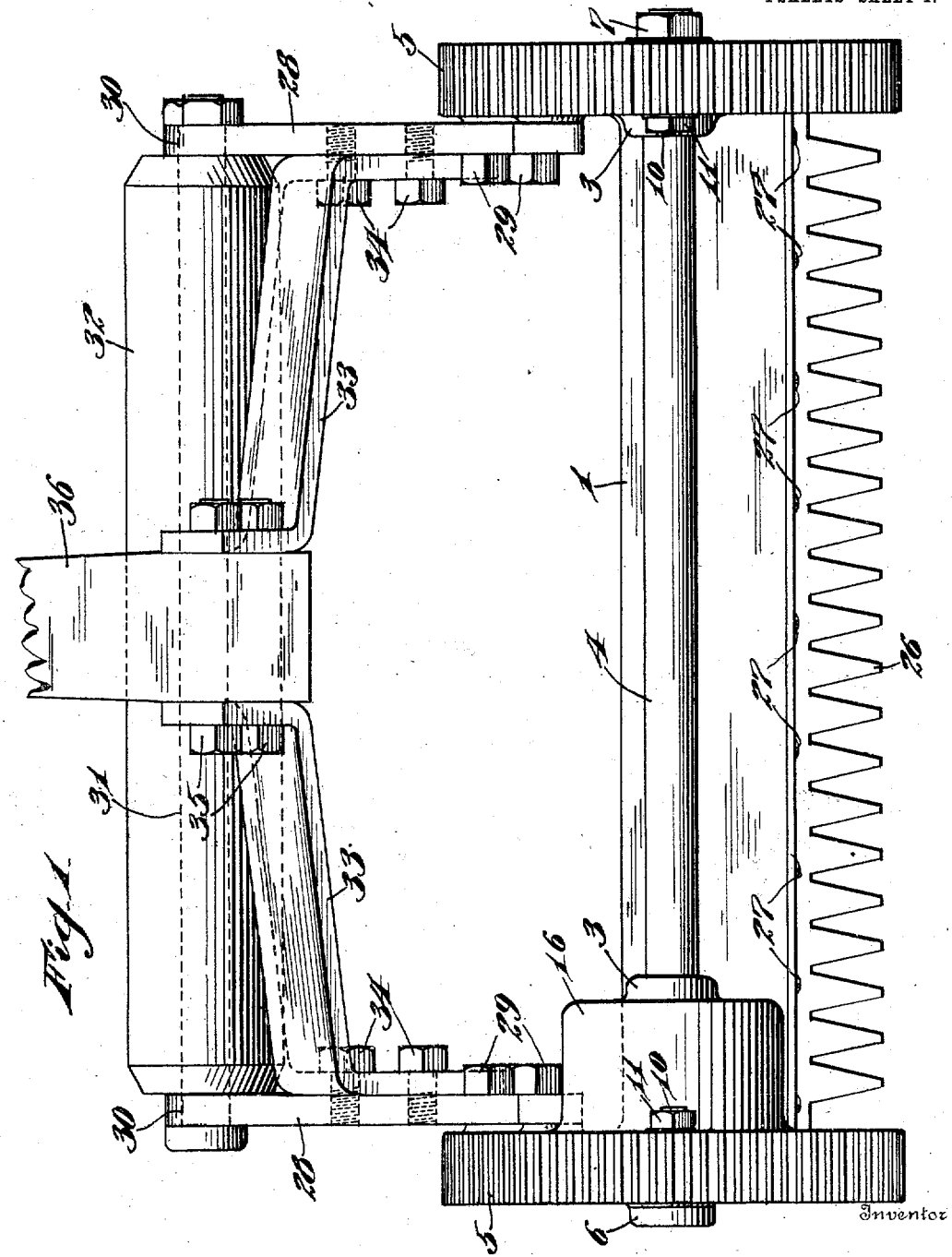
Figure 2:
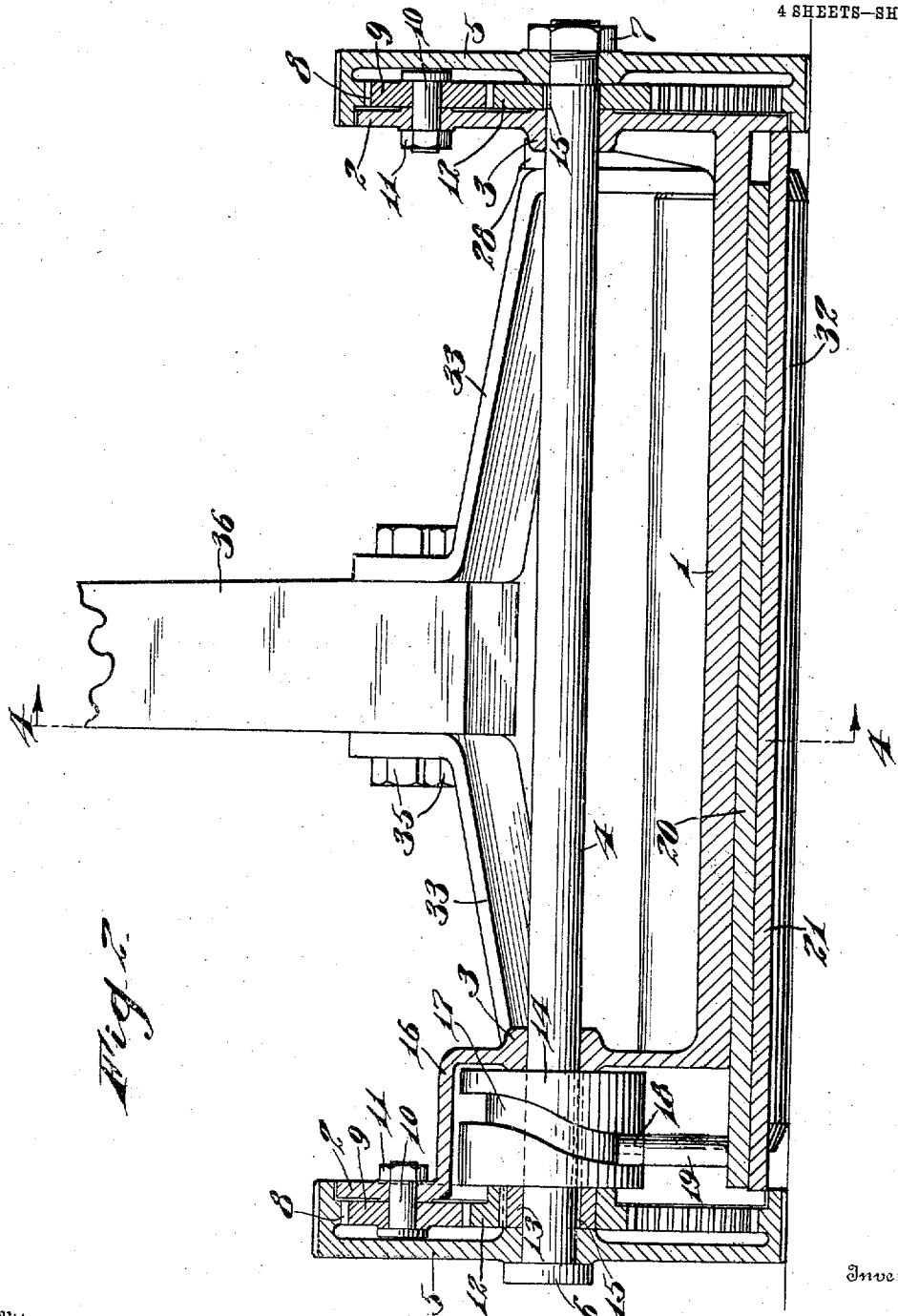
Figure 3:
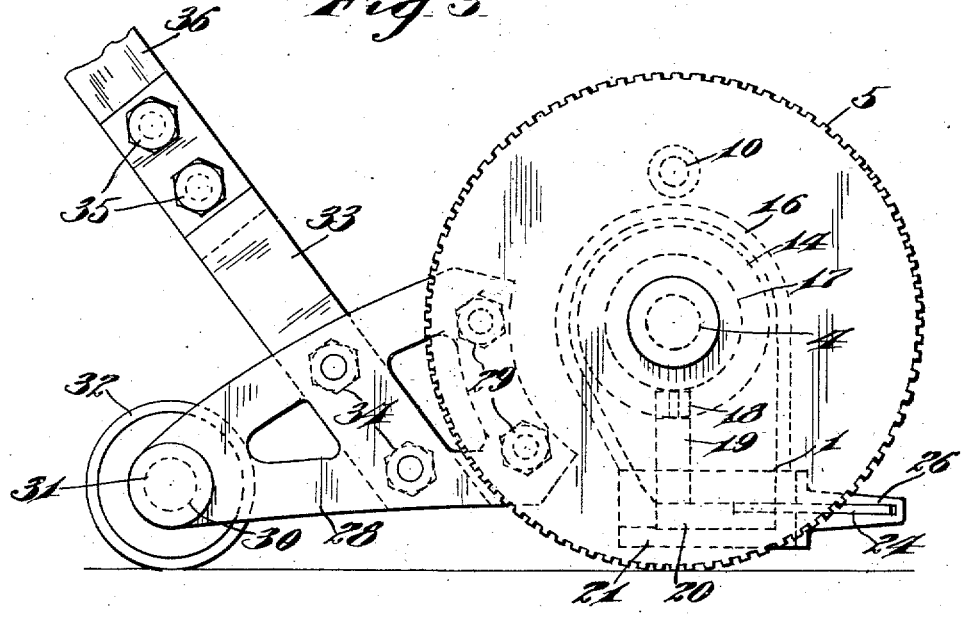
Figure 4:
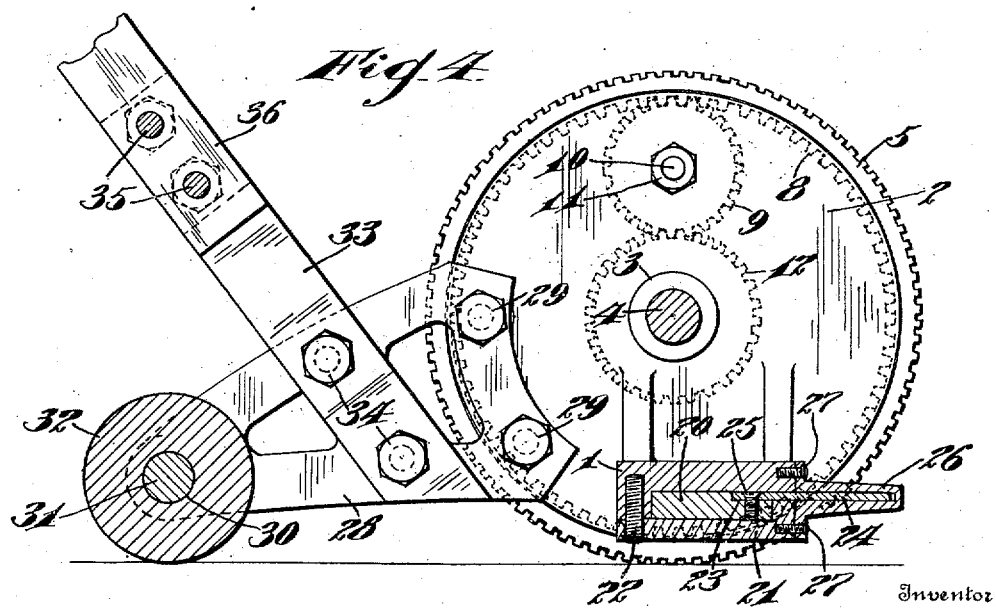

In the accompanying drawings, Figure 1, is a plan view showing the handle broken away and illustrating my improvements. Fig. 2, is a view in cross section longitudinally of the knife or cutter and frame. Fig. 3, is a view in side elevation. Fig. 4, is a view in section on the line 4—4 of Fig. 2. Figs. 5, 6, 7, 8, 9 and 10, are views illustrating various details of construction.

1 represents a casting, which is provided with circular disk like ends 2, having bearings 3 supported on shaft or axle 4. The shaft 4 projects through and is supported in wheels 5, having roughened peripheries to take hold of the ground. These wheels 5 are loose on shaft or axle 4, and the latter is provided with a head or enlargement 6 at one end, and screw threaded at its other end for the reception of a nut 7, to hold the wheels on the shaft.

The wheels 5 are provided with internal racks or gear teeth 8, which mesh with the teeth of pinions 9, the latter supported on short shafts or bolts 10, secured in the ends 2 of casting 1 by means of nuts 11. These pinions 9, in turn, mesh with pinions 12, one of which at the right of Fig. 2, is keyed directly to shaft 4 by means of a key 15, while the other pinion 12 at the left of Fig. 2 is keyed to a sleeve or collar 13, and the latter, and the cam 14 also on shaft 4, are locked to turn with the shaft, by means of a key 15. This cam 14 turns within a housing 16 formed by casting 1, and is provided with an annular cam or eccentric groove 17, into which a roller 18 on the upper end of a post 19 is positioned, so that when the shaft is turned, the cam 14 will transmit a reciprocating movement to the post 19. This post 19 is fixed to a bar 20, which is mounted to slide between the casting 1 and a bottom plate 21. The casting 1 and bottom plate 21 are of approximate L-shape in cross section as shown most clearly in Fig. 4, and the bottom plate 21 is secured to casting 1 by means of a series of screws 22. In a longitudinal recess 23 in bar 20 at the forward edge of the latter, a knife or cutter 24 is secured by screws 25, and as the upwardly projecting forward portion of bottom plate 21 terminates short of the casting 1, a space is provided for the forwardly projecting knife or cutter 24, to allow a free reciprocation of the latter in a guard bar 26, the latter secured by screws 27 to casting 1 and bottom plate 21. This guard bar comprises a series of slotted fingers, closed at their outer ends, and conforming in general shape to the shape of the cutting points or blades of the cutter, and as the knife reciprocates in the guard fingers, it will cut the grass, as will be readily understood. Rearwardly projecting brackets 28 are secured to the disk like portions 2 by means of bolts or screws 29, and provide bearings 30 for the shaft 31, on which the rear roller 32 is mounted. Angle brackets 33 are secured by bolts 34 to the brackets 28, and are also secured by bolts 35 to the handle 36, and constitute in effect a fork connecting the handle with the brackets 28.

The operation is as follows: As the machine is moved over the ground, traction wheels 5 will transmit motion to pinions 9, and the latter to pinions 12, to drive shaft 4 and revolve cam 14. The revolution of cam 14 transmits to the post 19 and bar 20, and also to the cutter bar 24 carried thereby, a reciprocating movement, and as the cutter bar reciprocates in the guard fingers, it will effectually cut the grass, regardless of the height of the grass, and will cut it at a uniform height.

Various slight changes might be made in the general form and arrangement of parts described without departing from my invention, and hence I do not restrict myself to the precise details set forth, but consider myself at liberty to make such changes and alterations as fairly fall within the spirit and scope of the claims.

Having thus described my invention what I claim as new and desire to secure by Letters Patent is:

1. In a lawn mower, the combination with a casting, and vertical disk like portions at the ends of the casting, having alined openings, of a shaft or axle in said openings, traction wheels loose on said shaft and located around the disk like portions of the casting, internal gear teeth in said wheels, pinions transmitting motion from said internal gear teeth to said shaft, a cam keyed on said shaft, and having an annular cam groove, a bottom plate secured to the bottom of the casting, a bar mounted to slide between said bottom plate and said casting, a cutter or knife secured on said bar, and a post on said bar projecting into the groove in the cam.

2. In a lawn mower, the combination with a casting, and vertical disk like portions at the ends of the casting, having alined openings, of a shaft or axle in said openings, traction wheels loose on said shaft and located around the disk like portions of the casting, internal gear teeth in said wheels, pinions supported on the disk like portions meshing with the internal gear teeth, other pinions keyed to the shaft and meshing with the first mentioned pinions, a cam keyed on said shaft and having an annular groove, one of said disk like portions of the casting forming a housing for said cam, a bottom plate secured to the bottom of the casting, a bar mounted to slide on said bottom plate, a post on said bar projecting into the groove in the cam, a knife or cutter on said bar, and a guard bar secured to said casting and bottom plate, and having slotted guard fingers in which said knife or cutter reciprocates.

3. In a lawn mower, the combination with a casting, and vertical disk like portions at the ends of the casting, having alined openings, of a shaft or axle in said openings, traction wheels loose on said shaft and located around the disk like portions of the casting, internal gear teeth in said wheels, pinions transmitting motion from said internal gear teeth to said shaft, a cam keyed on said shaft, and having an annular cam groove, a bottom plate secured to the bottom of the casting, a cutter bar mounted to slide on the bottom plate between the same and the casting, a post on said bar, a roller on said post located in the groove in the cam, a guard bar secured to said casting and plate, comprising a series of guard fingers having closed outer ends, and a cutter blade or knife secured to said cutter bar and movable in the guard fingers.

4. In a lawn mower, the combination with a casting, and vertical disk like portions at the ends of the casting, having alined openings, of a shaft or axle in said openings, traction wheels loose on said shaft and located around the disk like portions of the casting, internal gear teeth in said wheels, pinions supported on the disk like portions and meshing with the internal gear teeth, other pinions keyed to the shaft and meshing with the first mentioned pinions, a cam keyed on said shaft and having an annular cam groove, one of said disk like portions of the casting forming a housing for said cam, a bottom plate secured to the bottom of the casting and forming a chamber, a cutter bar mounted to slide on said bottom plate, a post on said bar, a roller on said post located in the groove of the cam, a guard bar secured to said casting and plate, and comprising a series of guard fingers having closed outer ends, and a cutter blade or knife secured to said cutter bar and movable in the guard fingers.

5. In a lawn mower, the combination with a casting, and vertical disk like portions at the ends of the casting, having alined openings, of a shaft or axle in said openings, traction wheels loose on said shaft and located around the disk like portions of the casting, internal gear teeth in said wheels, pinions transmitting motion from said internal gear teeth to said shaft, a cam keyed on said shaft, and having an annular cam groove, a bottom plate secured to the bottom of the casting, a bar mounted to slide between said bottom plate and said casting, a cutter or knife secured on said bar, a post on said bar projecting into the groove in the cam, rearwardly projecting brackets secured to the disk like portions, a roller supported in said brackets, a handle, and angle brackets securing the handle to said first mentioned brackets.

6. In a lawn mower, the combination with a casting, and vertical disk like portions at the ends of the casting, having alined openings, of a shaft or axle in said openings, traction wheels loose on said shaft and located around the disk like portions of the casting, internal gear teeth in said wheels, pinions supported on the disk like portions meshing with the internal gear teeth, other pinions keyed to the shaft and meshing with the first mentioned pinions, a cam keyed on said shaft and having an annular groove, one of said disk like portions of the casting forming a housing for said cam, a bottom plate secured to the bottom of the casting, a bar mounted to slide on said bottom plate, a post on said bar projecting into the groove in the cam, a knife or cutter on said bar, and a guard bar secured to said casting and bottom plate, and having slotted guard fingers in which said knife or cutter reciprocates, rearwardly projecting brackets secured to the disk like portions, a roller supported in said brackets, a handle, and angle brackets securing the handle to said first mentioned brackets.

7. In a lawn mower, the combination with a casting, and vertical disk like portions at the ends of the casting, having alined openings, of a shaft or axle in said openings, traction wheels loose on said shaft and located around the disk like portions of the casting, internal gear teeth in said wheels, pinions transmitting motion from said internal gear teeth to said shaft, a cam keyed on said shaft, and having an annular cam groove, a bottom plate secured to the bottom of the casting, a cutter bar mounted to slide on the bottom plate between the same and the casting, a post on said bar, a roller on said post located in the groove in the cam, a guard bar secured to said casting and plate, comprising a series of guard fingers having closed outer ends, a cutter blade or knife secured to said cutter bar and movable in the guard fingers, rearwardly projecting brackets secured to the disk like portions, a roller supported in said brackets, a handle, and angle brackets securing the handle to the said first mentioned brackets.

8. In a lawn mower, the combination with a casting, and vertical disk like portions at the ends of the casting, having alined openings, of a shaft or axle in said openings, traction wheels loose on said shaft and located around the disk like portions of the casting, internal gear teeth in said wheels, pinions supported on the disk like portions and meshing with the internal gear teeth, other pinions keyed to the shaft and meshing with the first mentioned pinions, a cam keyed on said shaft and having an annular cam groove, one of said disk like portions of the casting forming a housing for said cam, a bottom plate secured to the bottom of the casting and forming a chamber, a cutter bar mounted to slide on said bottom plate, a post on said bar, a roller on said post located in the groove of the cam, a guard bar secured to said casting and plate, and comprising a series of guard fingers having closed outer ends, and a cutter blade or knife secured to said cutter bar and movable in the guard fingers, rearwardly projecting brackets secured to the disk like portions, a roller supported in said brackets, a handle, and angle brackets securing the handle to said first mentioned brackets.

In testimony whereof I have signed my name to this specification in the presence of two subscribing witnesses.

JOSIAH H. SMITH.

Witnesses:
R. H. KRENKEL,
J. A. L. MULHALL.